Aug. 14, 1956     E. J. CHRISTENSEN     2,758,848
GOLF CART WITH SWINGABLE WHEEL CARRIAGES
Filed March 6, 1953     3 Sheets-Sheet 1
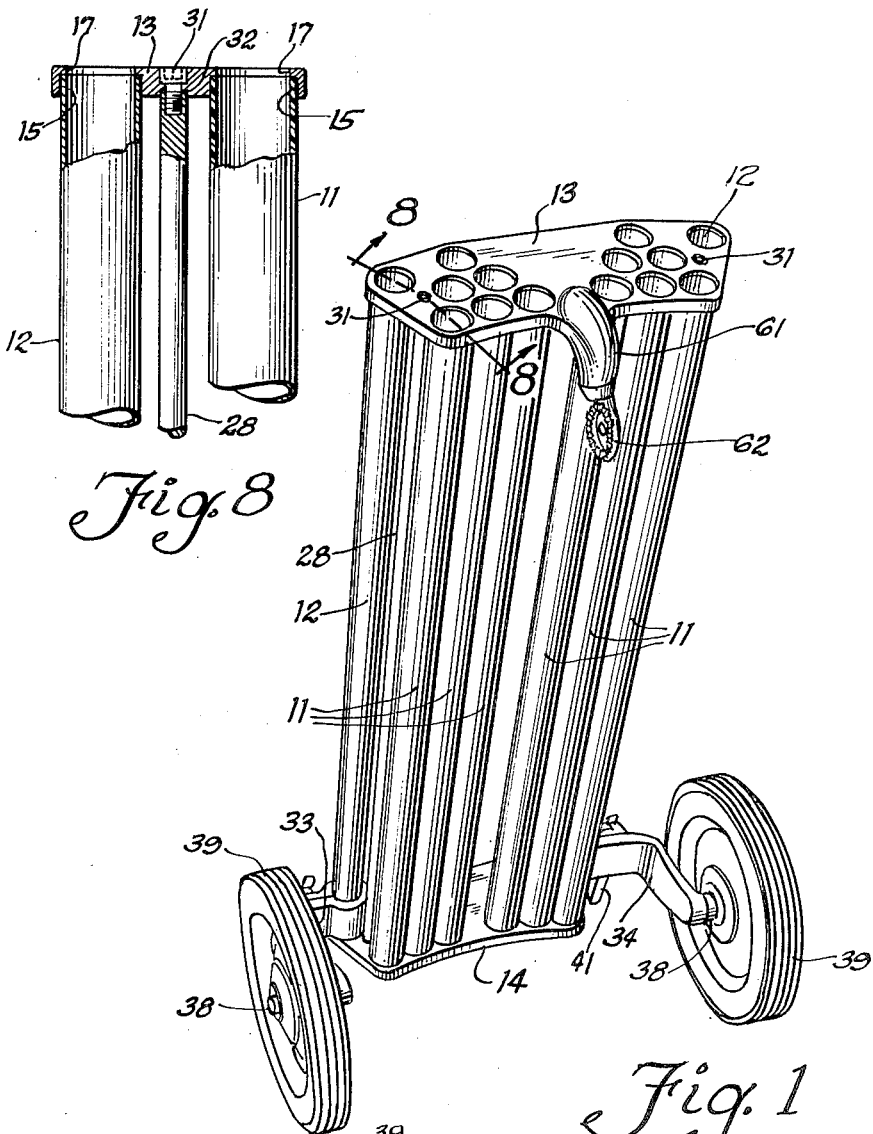
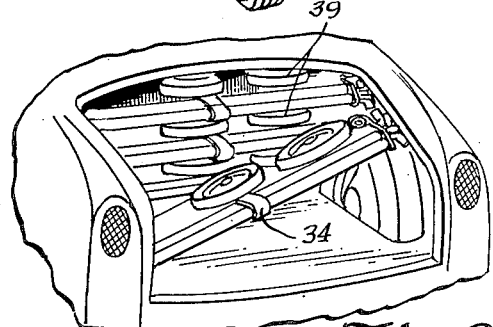
INVENTOR.
Edmund J. Christensen
BY
Attorney

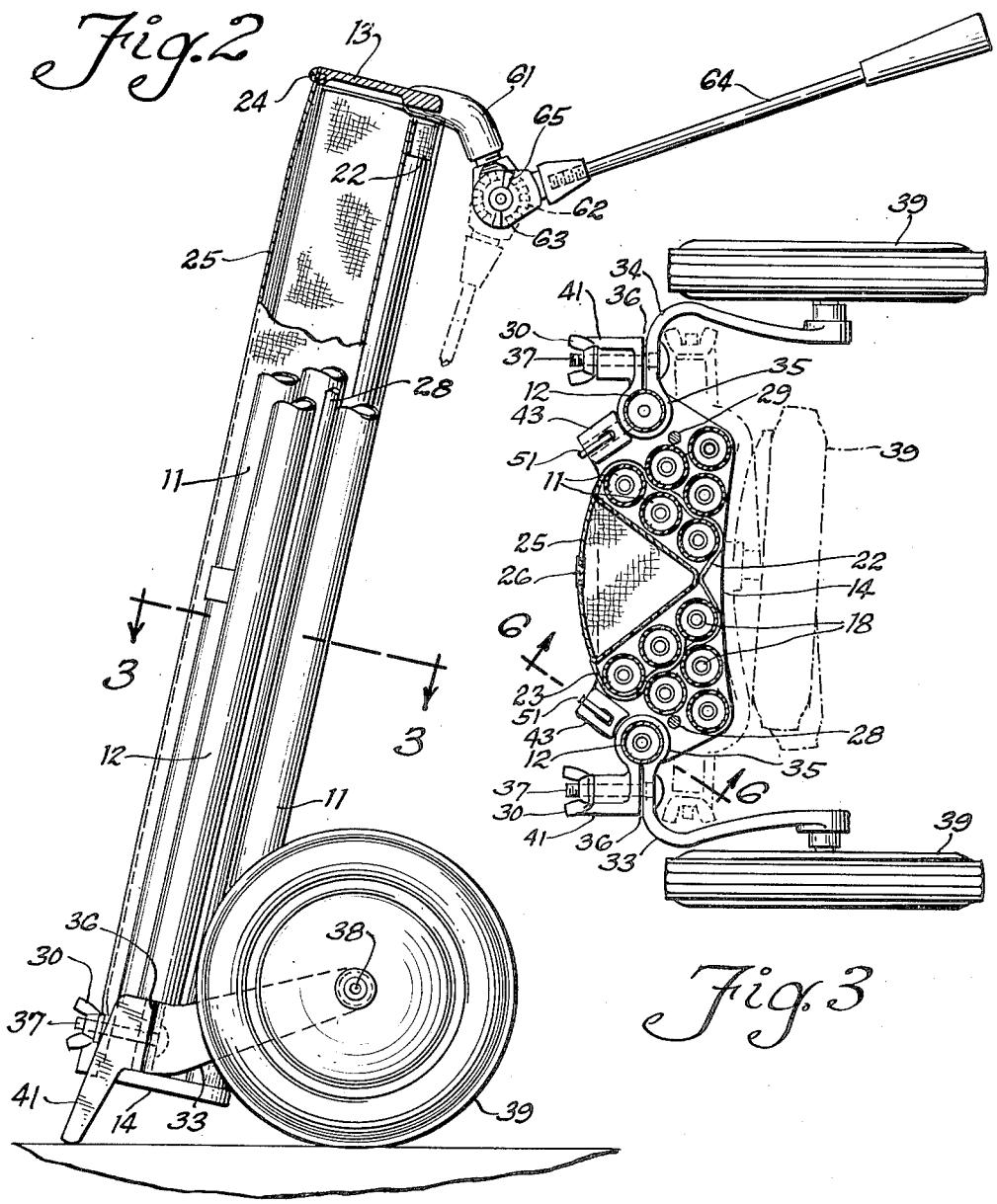

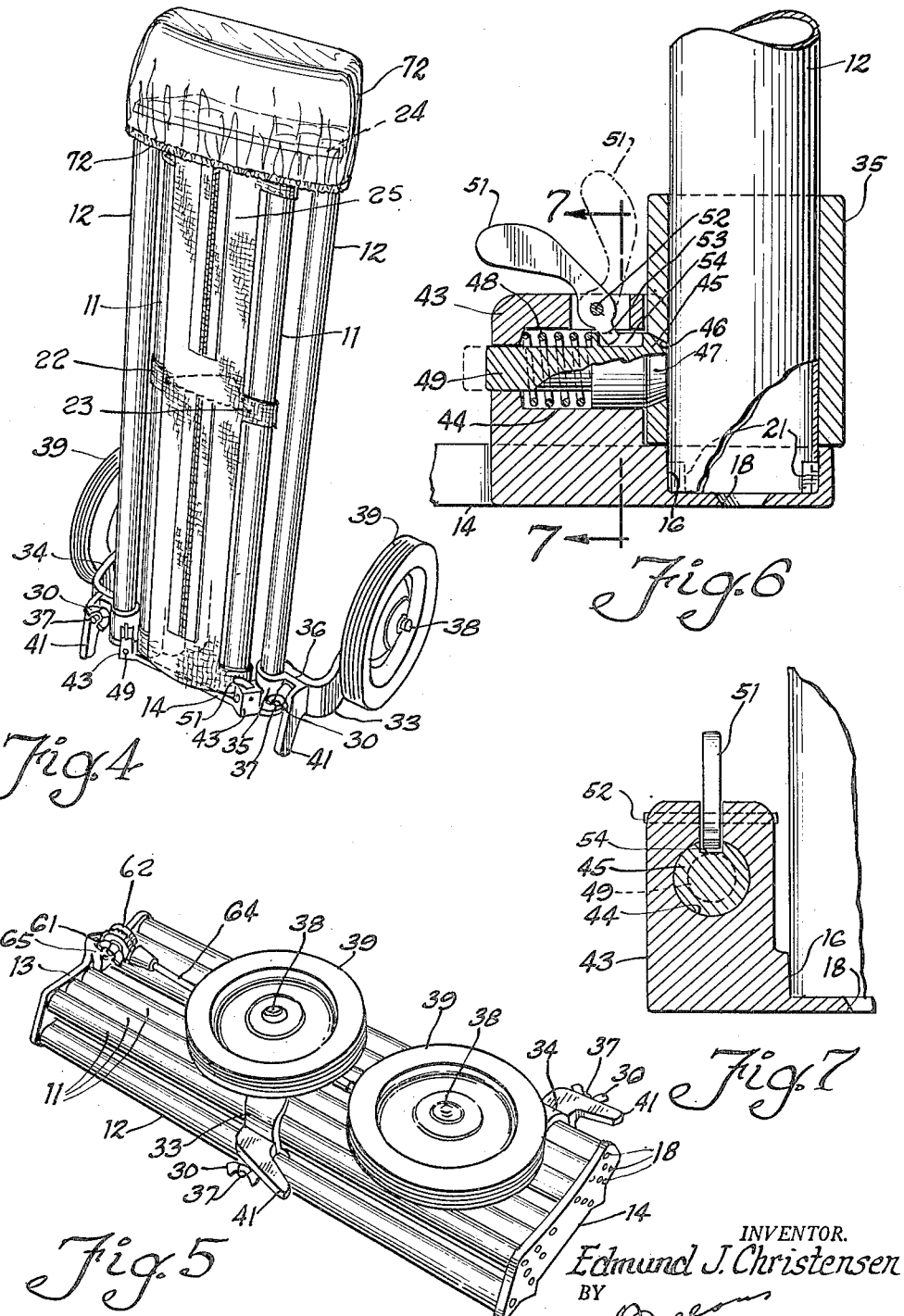

United States Patent Office 2,758,848
Patented Aug. 14, 1956

2,758,848

GOLF CART WITH SWINGABLE WHEEL CARRIAGES

Edmund J. Christensen, South Milwaukee, Wis.

Application March 6, 1953, Serial No. 340,884

3 Claims. (Cl. 280—40)

The present invention relates to golf club carrying vehicles and concerns itself more particularly with a combined golf club receptacle and collapsible cart which is foldable into small storage space.

It is a principal object of the present invention to provide a rugged, easily maneuverable portage vehicle for carrying golf clubs and other player accessories in an orderly and systematic manner so that the clubs are maintained in a predetermined array with each club housed in an individual socket or receptacle separate and spaced from the other clubs whereby to make selection and withdrawal of a club an instantaneous movement.

Another object of the present invention is to devise such receptacle and vehicle cart in a combined unitary structure so as to obtain over-all compactness both during utility and storage conditions, while at the same time the device is possessed of low weight and minimum moving parts permitting the cart to be easily lifted and hauled from one position to another along a golf course with least physical effort.

Still another object of the present invention is to provide a combined golf receptacle and wheeled carrying cart in which the wheels and other protuberant parts are foldable into close compact disposition with the principal body portion so as to occupy a minimum of storage space and making possible the stacking of a plurality of such devices within the limited accommodations of an automobile trunk.

Still another object of the present invention is to provide a sturdy and rigid structure for containing golf clubs in combination with a portage vehicle that may be easily drawn from one place to another over various surface terrain as the game is played while disposing each club in spaced relationship from the other clubs to result in a minimum of scuffing or chipping such as is sometimes caused by the engagement of the metal parts of one club against the vulnerable parts of another, and so that the clubs when contained in said receptacle in upright or stored condition are effectively protected against exposure, load strains and damage by companion cargo.

The manner in which the foregoing and other objects and features of the invention are accomplished will become apparent during the course of the following detailed description having particular reference to the accompanying drawing, wherein Fig. 1 is a perspective view of a golf cart with the handle element and certain accessory parts removed for the purpose of certain explicit disclosure, Fig. 2 is a side elevational view with portions broken away of a golf cart having embodied therein various features of the present invention, Fig. 3 is a transverse sectional plan view taken approximately on the line 3—3 of Fig. 2, Fig. 4 is a frontal perspective view of a golf cart embodying various features of the present invention and illustrated with a removable shielding bonnet placed thereon, Fig. 5 is a perspective view of a golf cart which embodies various features of the present invention shown in its folded or compact position in readiness for storage, Fig. 6 is a fragmentary detail sectional view of a wheel bracket locking mechanism, Fig. 7 is a fragmentary sectional detail view taken on line 7—7 of Fig. 6, Fig. 8 is a fragmentary detail sectional view taken approximately on line 8—8 of Fig. 1, and Fig. 9 is a fragmentary perspective view looking into the interior of an automobile storage trunk which illustrates how the limited space accommodations thereof may be utilized to hold four sets of playing equipment as a result of the dimensional efficiencies of the present invention.

The receptacle portion of the proposed apparatus which replaces the customary shoulder bag is comprised of a series of parallelly disposed tubular elements 11 and 12 of which the former are preferably made of a durable but light weight plastic arranged in two triangular groups, Figs. 1 and 3, and of which the latter comprise two extreme single members. The receptacle tubes 11 may advantageously be cut from tubular stock into similar lengths or they may be thus molded and assembled between the top and bottom end plates 13 and 14 respectively.

Each of the end plates 13 and 14 is a cast or molded element contoured so as to provide the indicated arrangement of shallow tube receiving recesses as at 15, Fig. 8, or 16, Fig. 6. The apertures of plate 13 are slightly reduced as at 17, thereby providing an internal diameter conforming to that of the tubular elements 11 and 12 and affording dimensional continuity for the reception therewithin of a corresponding one of a set of golf clubs according to a prescribed or predetermined arrangement. In this way there is provided an established location for each type of club which the player may easily remove, or replace without encountering conflict with the heads or shafts of any of the other clubs of the set.

In the lowermost plate element 14 continuation appertures 18 are provided but these are of considerably smaller diameter serving the purpose of drainage or escape to any moisture, dirt or other foreign matter that may gain access to the interior of the tubes. It is called to attention that while the predominant class of tubes 11 are indicated as being freely rotatable within their recessed accommodations 15, means is provided for preventing the rotation of the endmost tubular elements 12 by reason of the formation of minute lug projections 21 which extend into corresponding notch formations in the lowermost extremities of the tubular walls. The purpose of preventing the rotation of tubes 12 will be explained later.

In accordance with the proposed arrangement a total of fourteen tubular receptacle elements numbered 11 and 12 is provided which number is adequate to accommodate the maximum number of golf clubs required or permitted to perform all manner of play, according to accepted rules of competition. The plastic tubes 11 are arranged in two triangular groups, Figs. 1 and 3, affording between them a substantially triangular space which may be occupied by a correspondingly shaped utility bag, Fig. 4, advantageously divided by a horizontal partition into subcompartments to serve the purpose of carrying spare balls, garments, or other player requirements.

In order to support the utility bag in the indicated location, this member may be provided with stabilizing loop formations 22 and 23, Fig. 3, as well as with snap-button or other attachment devices 24, Fig. 2, by means of which it may be secured to the top and bottom plate elements 13 and 14. The front wall panel elements 25 of the bag are "Zipper" lined as at 26 in order to provide a convenient manner of quick and facile access to the bag compartments. The loop formations 22 and 23 may be slid over the adjacent receptacle tubes 11 or by being formed with securement means may be threaded through and lashed into place where removability thereof is desired.

The club carrying assembly which is comprised of the tubular receptacles 11 and 12 together with the already described top and bottom plate numbers 13 and 14 may be held together through the instrumentality of a pair of space establishing tie rods 28 and 29 located after the manner indicated best in Fig. 3 and secured as shown in Fig. 8. Each tie rod 28 and 29 is threaded at both ends for the reception therewithin of a cap screw 31. For added security the ends of the tie rods may be recessed as at 32 in order to seat themselves more securely and form a firm connection with its end panels 13 and 14. During assembly, all of the tubular receptacles 11 and 12 may be held in place, the two end plates 13 and 14, are then brought into position, following which the cap screws 31 are drawn up tightly and in this way there is distributed an adequate holding tension distributed over and confining all of the receptacle tubes.

It is to be noted that before the receptacle assembly is put together after the manner just described it may be desirable to insert the loop elements 22 and 23 of the utility bag, unless, of course, the loop elements are open ended with securing means for applying them subsequently. Also, before the tubes are placed and secured it is important to slide over the extreme corner ones of them numbered 12, the wheel support brackets 33 and 34.

The latter elements are identical but symmetrically opposite. Each bracket comprises a principal sleeve section 35, see also Fig. 6, split as at 36 and snugly embracing its respective tube element 12 so as to be slideable or tightly held thereon in accordance with the adjustment of a wing nut 30 and clamp bolt 37 associated therewith.

The wheel brackets 33 and 34 are characteristically curved as best indicated in Fig. 3, so as to assume the contour hugging or wrap-around characteristic shown, and bearing at their extremities stub shafts 38 on which are rotatable the rubber tired flange disc wheels 39. When in their active positions, as indicated in Figs. 1 and 2, the brackets 33 and 34 are disposed to present the wheels 39 in parallel running alignment with their stub shafts 38 in axial alignment. Under their alternative conditions however, Fig. 5, the brackets are swung around after the manner indicated in dotted outline Fig. 3, one higher than the other, to present the wheels 39 in close juxtaposition to the rear surface of the receptacle assembly.

In order to afford a proper inclination or cant to the wheeled carriage and receptacle assembly, the bracket elements 33 and 34 are provided with downwardly and forwardly extending lugs 41, Fig. 4, of such length as to obtain the relative disposition best indicated in Fig. 2. These lugs, by being integral with the bracket elements, as aforestated, recede from their active position when the wheels are folded up and come to be disposed after the manner illustrated in Fig. 5, thereby diminishing the overall length of the assembly to that extent when in packaged condition for storage or shipment.

While the frictional clamping arrangement with the sleeve portions 35 split as at 36 serves adequately to retain the brackets in either of their alternative positions of placement, it may be advisable to provide more definite locating means to assure proper alignment. Towards this end the base plate casting 14 is equipped at its foremost edge and on opposite extremities with block formations 43 each one of which contains an accurate bore 44 providing housing accommodation for a spring loaded locating plunger 45. The related sleeve element 35 of the corresponding wheel bracket is correspondingly bored as at 46 for the reception therewithin of a conically tapered extremity 47 of its locating plunger 45.

The coil spring 48 which surrounds the reduced shank portion 49 of the pins or plungers 45 normally urges the latter in a forward direction whereat the nose portion 47 is constrained to enter a similarly shaped bored recess 46 in the wall of sleeve portion 35. Each pin 45 is capable of being retracted to its dotted outline position, Fig. 6, under the actuation of a manually operable lever 51, pivoted at 52 and including a short projecting arm 53 which is adapted to reside within a longitudinal slot 54 formed in the major diameter portion of pin 45. When lever 51 is in its dotted outline position, projection 53 is adapted to engage the shoulder at the inner end of slot 54 and to retract the pin 45 longitudinally until the conically beveled extremity 47 is clear of the detent recess 46. Thereupon each wheel bracket 33 or 34 is free to be slid longitudinally on its related tubular element 12 and to be rotated thereon from its active radial position to its repose or storage position, Fig. 5.

For more convenient manipulation and guidance of the golf cart, the top plate element 13 is preferably equipped with a centrally located and downwardly angling bracket projection 61, Figs. 1 and 2 terminating with a radially serrated adjustment disc 62 which is adapted to cooperate with a similar disc formation 63 in an angularly adjustable guide handle 64. By loosening the wing nut 65 whose bolt is coaxial with the disc elements 62 and 63, the handle portion may be loosened sufficiently to permit a variety of angular adjustments as between the two parts or a total angular displacement of the handle portion 64 into the position in which it is indicated in Fig. 5 in contemplation of packing or storage.

The apparatus thus provides a sturdy, durable vehicle capable of withstanding the rigors of play as well as of contemplative shock and violent handling matched by attractiveness. In its storage condition the overall dimensions are a minimum such that four such carts together with their contained sets of golf clubs are capable of being stored within the customary accommodations of conventional automobile trunk storage spaces as indicated in Fig. 9. The width dimension of three such carts is such that they may easily be stacked into the forward space portion of an automobile trunk permitting the fourth set of clubs and its cart to be inclined over the spare tire after the manner indicated in this illustration thereby efficiently utilizing available car space. By reason of this achievement it becomes possible to store the playing instrumentalities of a complete foursome within the accommodations of a single automobile, an accomplishment singularly unmatched by prior golf club carts of corresponding versatility.

In view of the flanged end plate provisions particularly at the uppermost extremity of the assemblies, a retentive quality is achieved, making it possible to utilize a protective shroud or hood 71 which may be either elastically skirted as at 72 or provided with draw string or other fastening media independent of or coupled to the peripheral flange accommodations of plate 13.

While the present invention has been explained and described with reference to certain indicated embodiments it will be understood and nevertheless the various changes and modifications are susceptible of being incorporated without departure from its essential spirit or scope. Accordingly, it is not intended to be limited to the particulars of the accompanying illustrations nor to the language employed in the foregoing description except as indicated in the hereinafter appended claims.

What is claimed is:

1. In a golf club cart, a plurality of tubes, one for each golf club of a set, parallelly disposed in two adjacent groupings, one of the tubes of each grouping being spaced-apart and outermost of its grouping, plates at top and bottom of said tubes having recesses located in accordance with said groupings for receiving respective tube ends therein, clamp means for securing said plates to each other with said plurality of tubes therebetween, a pair of roller wheels on which the cart is adapted to be wheeled, and a pair of support brackets, one for each of said roller wheels and each including a portion for encircling a related one of said spaced-apart tubes, said portion comprising a split sleeve and clamp screw for constricting the sleeve on its spaced-apart tube, and a further portion forming an angular offset and terminating with a stub shaft for its said roller wheel, said further portion being in each bracket of the pair so offset as to conform with the cross-sectional contour of its related tube grouping so that by rotating the bracket about its encircled and spaced-apart tube, its borne roller wheel may be shifted between active ground engaging position and inactive position adjacent the tube groupings.

2. In a golf club carrying cart, a principal body portion which comprises a plurality of tubulations parallelly clustered for containing the shafts of a set of golf clubs, end plates between which said tubulations are confined, said end plates having apertures arranged to establish said tubulation clusters, tie rod means for clamping said end plates in spaced relation to one another, a pair of wheels on which said cart is adapted to be hauled, a pair of support brackets, one for each wheel, and each having a sleeved portion for snugly embracing one of said tubulations, clamp means for constricting and thereby binding each of said bracket sleeve portions on its tubulation, and aperture portions on each of said sleeve portions and spring loaded detent means associated with one of said end plates for entering said aperture portions for locating predetermined axial and angular relationship respecting each of said brackets and its supporting tubulation.

3. In a golf cart or similar article, a receptacle portion which comprises a plurality of tubes parallelly arranged and segregated into balanced clusters, each tube being allotted to a certain golf club of a set of clubs and adapted to receive the shaft of its club, end plates having apertures in correspondence with the tube clusters, clamp means between said end plates for securing said tubes between them, a pair of idler wheels on which said cart is adapted to be rolled, a support bracket for each of said wheels comprising an axle portion on which its wheel is journalled and a split sleeve portion slidably receivable on extreme ones of the tubes, clamp means for securing said split sleeve portions at proper locations on their respective tubes, and latch elements carried by said end plates for entering locating holes in its bracket and thereby aligning axially and radially its bracket in respect to its tube for placing the wheels in operative position.

References Cited in the file of this patent

UNITED STATES PATENTS

| | | |
|---|---|---|
| D. 139,707 | Jessen | Dec. 12, 1944 |
| D. 166,308 | Grant | Apr. 1, 1952 |
| 1,409,838 | Emery et al. | Mar. 14, 1922 |
| 1,951,492 | Schneider | Mar. 20, 1934 |
| 2,571,392 | Stringer | Oct. 16, 1951 |
| 2,662,776 | Hurst | Dec. 15, 1953 |
| 2,681,232 | Womack | June 15, 1954 |

FOREIGN PATENTS

| | | |
|---|---|---|
| 829,858 | Germany | Jan. 31, 1952 |